W. ROBINSON.
ELECTRIC RAILWAY SYSTEM.
APPLICATION FILED MAR. 13, 1905. RENEWED AUG. 27, 1907.
901,380.
Patented Oct. 20, 1908.
2 SHEETS—SHEET 1.
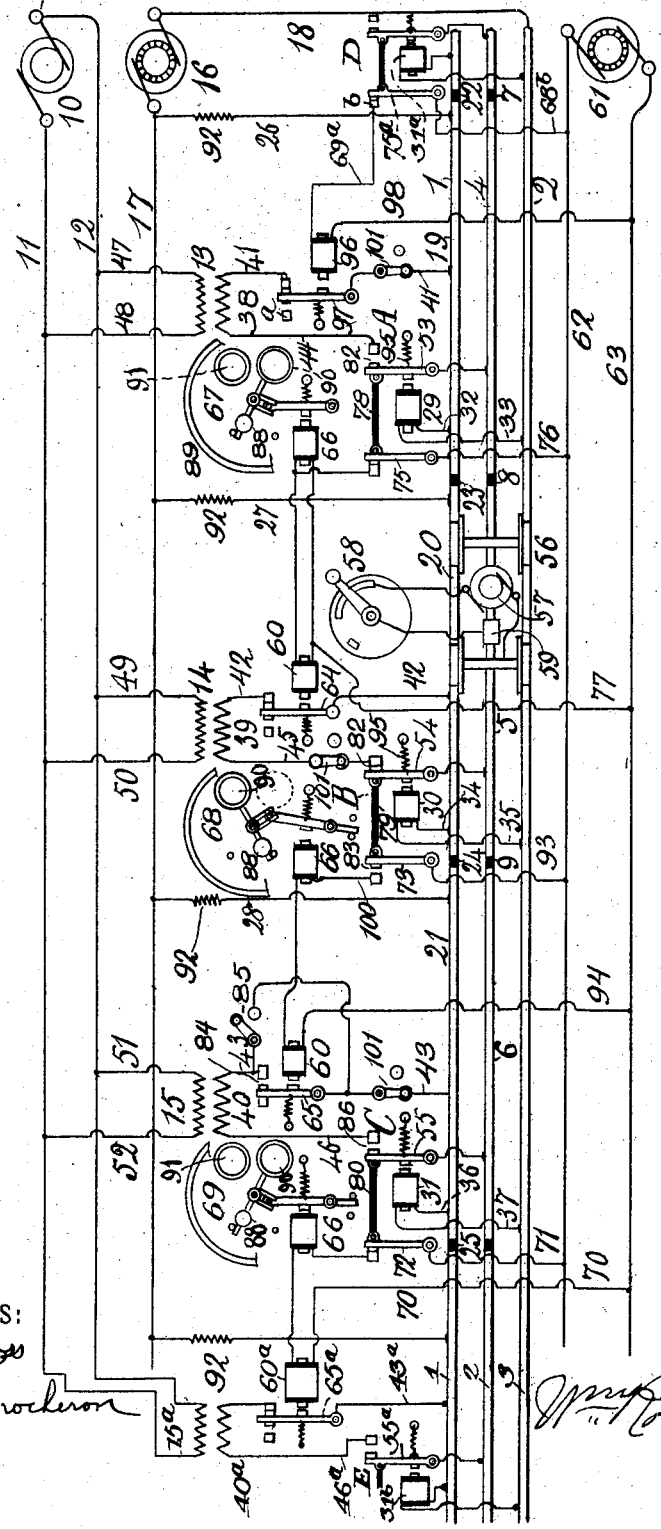
WITNESSES:
INVENTOR W. ROBINSON.
ELECTRIC RAILWAY SYSTEM.
APPLICATION FILED MAR. 13, 1905. RENEWED AUG. 27, 1907.
901,380.
Patented Oct. 20, 1908.
2 SHEETS—SHEET 2.
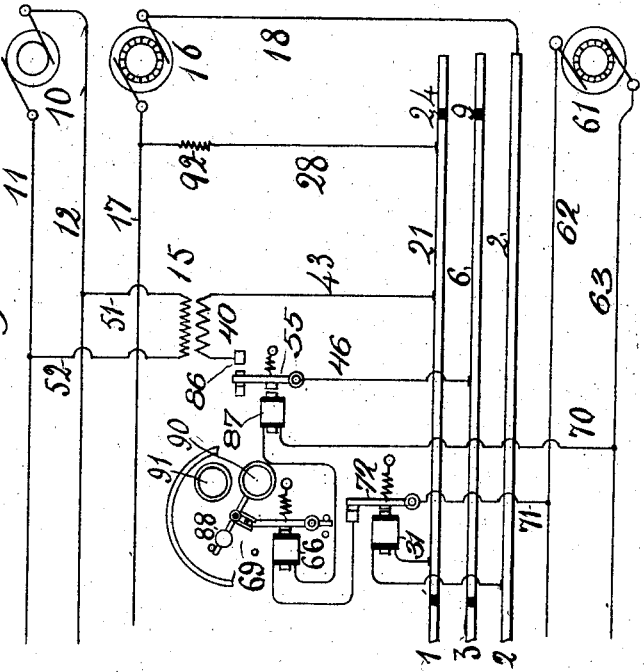
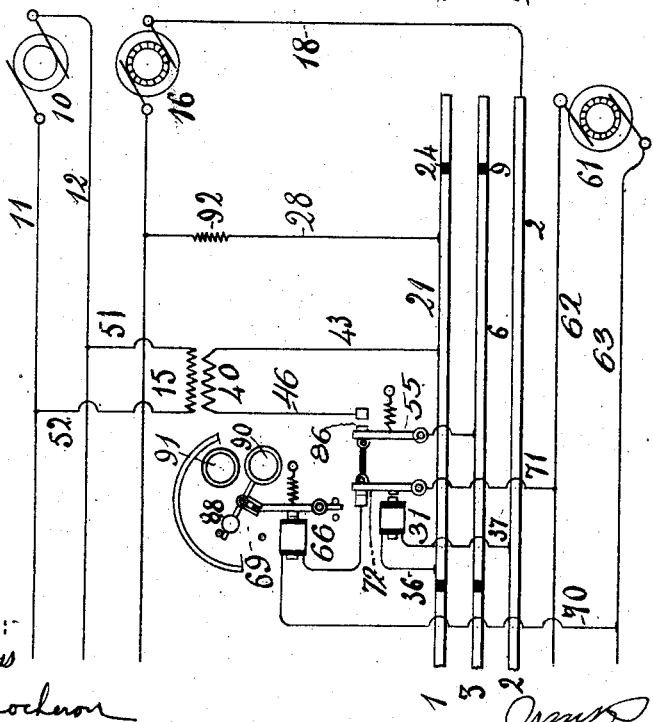
WITNESSES:-
INVENTOR

UNITED STATES PATENT OFFICE.

WILLIAM ROBINSON, OF BROOKLYN, NEW YORK.

ELECTRIC-RAILWAY SYSTEM.

No. 901,380.   Specification of Letters Patent.   Patented Oct. 20, 1908.

Application filed March 13, 1905, Serial No. 249,762. Renewed August 27, 1907. Serial No. 390,379.

*To all whom it may concern:*

Be it known that I, WILLIAM ROBINSON, a citizen of the United States, and resident of Brooklyn, in the county of Kings and State of New York, have invented a new and Improved Electric-Railway System, of which the following is a specification.

My invention has particular reference to electric railways in which alternating currents are delivered to, and utilized by, electric motor cars or locomotives.

The nature of my invention will be understood from the description which follows, reference being had to the accompanying drawings which form a part of this specification, in which Figure 1 is a diagram illustrating the main features of my invention, Fig. 2 a similar diagram showing a slight variation between the relative arrangement of the main switch and the relay controlling its operation, and Fig. 3 is a similar view showing a preferable arrangement for controlling the main switch by means of a heavier current than that illustrated in the other figures.

1, 2, represent a railroad track, and 3 a third rail or working conductor made in sections 4, 5 and 6, separated or insulated from one another, as shown at 7, 8 and 9.

10 represents a high voltage alternating current generator, from which proceed the leaders 11, 12, to which are connected the step down transformers 13, 14, 15, located at suitable intervals, by the wires 47, 48, 49, 50, 51 and 52.

16 represents a direct current generator of comparatively low potential, and 17 a feeder proceeding therefrom, one terminal of said generator being connected by the wire 18 to the return rail 2.

The service rail 1 of the track is divided into sections 19, 20, 21, insulated from one another, as shown at 22, 23, 24, 25. The feeder 17 is connected to said respective sections of the service or track rail 1, preferably near one end of said sections, by the wires 26, 27, 28. At the opposite ends of said track sections, respectively, the relay magnets 29, 30, 31, have their opposite terminals connected respectively, to said track sections 19, 20, 21, and to the opposite or return rail 2 of the track, by the wires 32, 33, 34, 35, 36, 37. It will be seen then that said relays 29, 30, 31, are connected in multiple from the generator 16 to the track sections 19, 20, 21, and in their normal condition are magnetized by current from said generator entering at one end of said respective track sections, passing over the length of said sections, magnetizing said relay magnets, and returning by the opposite or return rail 2. The secondaries 38, 39, 40, of said transformers respectively, have one leg connected to said track sections 19, 20, 21, by the wires 41, 42, 43, and the opposite legs, respectively, to the third rail or contact sections 4, 5, 6, by the wires 44, 45 and 46, through the switches 53, 54, 55.

56 represents a motor car, locomotive or train driven by an alternating current motor 57. The car 56 is provided with the controller 58 and the current collecting shoe 59, which makes traveling contact with the sectional third rail 3.

The magnets 60 and 96, receiving current from the generator 61, through the feed wires 62, 63, and the branch conductors 76, 77, and 93, 94, and 98, $68^b$—$69^a$ control the switches 64, 65, 97, which are arranged to open and close circuit in the legs 41, 42, 43, respectively of the secondaries 38, 39, 40 of the transformers 13, 14, 15, as shown.

The switches 53, 75, are coupled together by the insulation 78; and in like manner the switches 54 and 73; and the switches 55 and 72 are similarly coupled by the insulators 79 and 80 respectively. Thus each of the relay magnets 29, 30, 31, operates two switches opening one and closing the other simultaneously.

The operation is as follows: When there is no car or train on the section the relay, 29 for instance, is magnetized as its normal condition, attracting its armature 53 and thus keeping the secondary 38 on open circuit at the contacts 82, that is, there is no working or heavy current of any kind connected to the working or contact section 4; thus this contact section is dead. Now let the motor car 56 enter upon the section 5, for instance, with the controller 58 on closed circuit, the wheels and axles close circuit between the rail section 20 and the return rail 2, thus short circuiting the current from the magnet 30, and thus demagnetizing said magnet, which instantly releases its armature 54, thus closing circuit at the contacts 82 and connecting the leg 45 of the secondary 39 to the contact section 5. The closing of circuit through the car controller 58 completes the circuit of the secondary 39 and thus furnishes working current to the motor 57, thus driving the car 56.

It will be seen that as soon as the car 56 leaves the block 20 the short circuit is instantly removed from the magnet 30; the current returns thereto, it reattracts its armature 54, thus opening circuit at the contact points 82 and disconnecting the leg 45 of the secondary 39 from the contact section 5, thus rendering said section dead. When the magnet 30 releases its armature and closes circuit at 82, as described, that movement also reverses the switch 73, thus opening, at the contacts 83, the circuit of the magnet 60. The latter magnet then instantly releases its armature 65, thus opening circuit at the contacts 84 in the leg 43 of the secondary 40. Assuming the car or train to be moving from left to right, it will be seen that by this arrangement when a train or car enters upon the section 5 it instantly opens the circuit of the secondary 40, at the contacts 84, thus cutting off the possibility of working current reaching a train on the preceding section. That is, a dead section is always kept between two trains running on the same track in the same direction; and even if a following train, by reason of headway, should enter upon the section 6 by coasting, it would nevertheless lose current the instant it entered upon said section, because of its supply circuit 40 being kept open at the contacts 84 by the preceding train. Nevertheless, on entering said section 6 the train would actuate the circuit instrument C, thus cutting off current from the section at its rear by opening the circuit of the magnet 60$^a$, which latter, releasing its switch 65$^a$, would thus open the circuit of the secondary 40$^a$.

It is evident that by the means described, a car or train, whether running or stopped, or blocked for any reason, will automatically protect itself from a rear end collision. When, however, it is desired to bring up a train or car in the rear to consolidate with or assist one ahead, this is readily done by closing the hand switch 85 around the automatic switch 65, without otherwise interfering in any respect with the operation of the system as described. The hand switch 85 may be placed at any convenient point.

While the above describes the system especially as applied to double track roads, it will be understood that trains can be run in the opposite direction, when necessary, on the track as described. Thus if the train or car 56 be run from right to left it will receive working current from the secondary 39 until the last truck has left the section 20. At that instant the circuit instrument B is reversed thus closing circuit through the magnet 60 and the leg 43 of the secondary 40, thus continuing current to the moving train. It will be noted that the first pair of wheels entering upon the track section 21 actuates the circuit instrument C, thus closing circuit in the leg 46 of the secondary 40.

In Fig. 2 the relay 31 is shown as directly actuating the switch 72, instead of the switch 55, thus removing said relay further away from any possible arcing which might occur in opening the working circuit at the contact points 86.

In Fig. 3 the switches 55 and 72 are mechanically separated and the additional magnet 87 is introduced to directly actuate the switch 55 in the leg 46 of the secondary 40. The magnet 87 is connected, as shown, through the switch 72 to the feeders 62, 63. I prefer this arrangement of circuits for the reason that the strength of current for operating the track relay 31 is necessarily very low, whereas the strength of current from the feeders 62, 63, is much greater, consequently by using the special magnet 87 in this connection a greater opening in the working circuit at the points 86, and more positive action, are obtained than when the switch in the working circuit is actuated directly by the track relay. The magnets 66, which control the automatic signals 67, 68, 69, also receive their operative current from said feed wires 62, 63. Said signals are controlled in one direction by the magnets 66, and in the opposite direction by counterweights 88, and have their circuits controlled, respectively, by the relays 29, 30, 31, as shown.

In connection with the circuit instrument B the signal magnet 66 is shown in series with the switch magnet 60, controlling the working-circuit switch 65, while, in connection with the circuit instrument A, the signal magnet 66 is shown as connected in multiple with the magnet 60, the circuit of both magnets being opened and closed by the switch 75.

Either the series or multiple connections described may be used, as found preferable under given conditions. An advantage of the multiple connection, however, is that the breaking of a wire disabling one of said magnets need not necessarily interfere with the proper operation of the other magnet.

The signals shown are intended to be conventional. They may be of the semaphore or of any other desired or suitable form or construction. As shown the signal 67, for instance, looking into the back of the signal box 89, has its transparent, colored disk 90 in a position of concealment; but when a car is on the track section 19 the magnet 66 is demagnetized, as heretofore explained, and the counterweight 88 swings said disk in front of the glass or "bull's eye" 91 in the signal box 89, thus exposing a danger or cautionary signal, as the case may be.

It will be seen that the signal is kept in the safety or concealed position by the magnetization of its controlling magnet and swung to the danger position by a counterweight, consequently any accidental breaking of a signal wire might result in the exposure of a danger signal when there was no danger but could not result in an indication of safety when there might be danger. Any error therefore, through accidental derangement, it is evident, will be on the side of safety. It is to be observed, furthermore, that the opening of the switch 75 from any cause, will not only cut off current from the signal magnet and expose the signal, but will also cut off current from the magnet 60, thus opening the switch 64 in the working circuit, thereby cutting off current from the car or train 56, and automatically stopping the same without action on the part of its motorman or driver.

The signals described may be placed in any desired or required position, abreast of the section entered upon by the train, a section, or half a section, to the rear, or a section, or a double section ahead, or in any other position as may be found desirable or advantageous.

Resistances 92 are placed in the branch wires 26, 27, 28, in order to prevent a train on one track section from short circuiting current carried by the feeder 17 from any other track section.

The springs 95 are intended to retract the armature levers in the usual way when the magnets controlling said levers are deënergized.

It will be seen that when the car passes from one section to another the working circuit is opened at the end of the section before it is opened at either of the described switches, consequently there can be no arcing at the contact points of said switches, since there is no current passing at the instant they are opened.

The hand switch 101 is inserted in the circuit of the secondaries as an emergency switch, to be opened in emergencies, as in case of a fire, or when men are at work on the section with which the current feeder is connected, thus rendering it impossible for a dangerous current to reach said section.

Having thus described my invention, what I claim as new, and desire to secure by Letters Patent, is—

1. An electric railway system comprising a railway track having one of its service rails formed in sections insulated from one another, a source of current supply having one terminal connected to one of said sections near its end, and the other terminal to the opposite service rail, a relay magnet having one terminal connected near the opposite end of said rail section and the other terminal to the opposite service rail, thus forming a closed rail circuit, a sectional working or contact conductor, an alternating current generator, leaders therefrom, the primary of a step down transformer connected to said leaders, the secondary of said transformer having one terminal connected to one of said service rail sections, and the other normally disconnected, electrically, from said sectional contact conductor, a switch under control of said relay, said switch being arranged to connect said secondary to a contact section of said sectional working conductor on the demagnetization of said relay magnet and to disconnect said secondary from said contact section on the magnetization of said relay.

2. An electric railway system comprising a normally closed rail circuit embodying a source of current supply having its opposite terminals connected to the opposite rails of said circuit and a relay magnet having its opposite terminals connected to said opposite rails at a distance from said current supply terminals, a working or contact conductor formed in sections separated or insulated from one another, an alternating current generator, leaders therefrom, the primary of a step down transformer connected to said leaders, the secondary of said transformer being normally disconnected from said working or contact sections, means under control of said relay for connecting said secondary to one of said contact sections and disconnecting the same therefrom, a return for said secondary, and means for controlling the magnetization and demagnetization of said magnet.

3. An electric railway system comprising a railroad track having one rail line formed in sections insulated from one another, a generator having a leader connected in multiple to said track rail sections, the opposite track rail forming a return to said generator, relay magnets having their opposite terminals, respectively, connected to said respective track rail sections and to said return rail, a sectional working or contact conductor, a high voltage alternating current generator, leaders therefrom, transformers having their primaries connected thereto, the secondaries of said transformers, respectively, having one terminal normally connected electrically to said track rail sections, and their opposite terminals normally electrically disconnected from said contact sections, means under control of said relays for completing electrical connection between said working or contact sections and said secondaries, on demagnetizing said respective magnets.

4. An electric railway system comprising a railroad track having one rail line formed in sections insulated or separated from one another, a generator furnishing current in multiple to said track sections, the opposite track rail forming a return to said generator, relay magnets having their opposite terminals, respectively, connected to said rail sections and to said return, a sectional working or contact conductor, a high voltage alternating current generator, leaders therefrom, the primaries of step down transformers connected thereto, the secondaries of said transformers, respectively, having their opposite terminals arranged for connection to said track sections and to said working or contact sections, but normally disconnected electrically from the latter, a plurality of automatic switches in the circuit of said secondaries, and means for actuating said switches independently of each other by trains or cars occupying different track sections.

5. In an electric railway system a working or contact conductor formed in sections separated or insulated from one another, a high voltage alternating current generator, leaders therefrom, step down transformers having their primaries connected thereto, one terminal of the respective secondaries of said transformers being arranged for connection to said contact sections but normally disconnected electrically therefrom and the opposite terminals being normally connected detachably to returns therefor, a plurality of electrically controlled automatic switches in the circuits of said respective secondaries, and means for actuating said switches automatically independently of one another through independent instrumentalities.

6. An electric railway system comprising a railroad track having one rail formed in sections insulated or separated from one another, means for furnishing current to said track sections, the opposite rail forming a return for said current, relay magnets having their opposite terminals, respectively, connected to said rail sections, and to said return, a sectional working or contact conductor, a high voltage alternating current generator, leaders therefrom, step-down transformers having their primaries connected thereto, secondaries of said transformers, respectively, having their opposite terminals arranged for connection to said track sections and to said working or contact sections, said secondaries being normally disconnected electrically from said contact sections, and means for connecting said secondaries to said contact sections on demagnetizing said respective relays, the presence of a car or train on one section operating to short-circuit the relay connected thereto, thus connecting one of said secondaries to the section thus occupied and simultaneously opening circuit in the secondary connected to a different section.

7. An electric railway system comprising a railroad track having one rail formed in sections insulated or separated from one another, means for furnishing current to said track sections, the opposite rail forming a return for said current, relay magnets having their opposite terminals, respectively, connected to said rail sections, and to said return, a sectional working or contact conductor, a high voltage alternating current generator, leaders therefrom, the primaries of step-down transformers connected thereto, secondaries of said transformers, respectively, having their opposite terminals arranged for connection to said track sections and to said working or contact sections, said secondaries being normally disconnected electrically from said contact sections, and means for connecting said secondaries to said contact sections on demagnetizing said respective relays, the presence of a car or train on one section operating to short-circuit the relay connected thereto, thus connecting one of said secondaries to the section thus occupied and simultaneously opening circuit in the secondary connected to a preceding section.

8. An electric railway system comprising normally closed rail circuits embodying sections of track, relays and a current feeder connected thereto, a sectional working or contact conductor, a high voltage alternating current generator, leaders therefrom, step-down transformers having their primaries connected to said leaders the secondaries of said transformers being normally connected to said track sections, and normally disconnected electrically from said contact sections, switches for connecting said secondaries to said contact sections and disconnecting the same therefrom, electrically controlled signals, and means for operating said switches and said signals simultaneously, through the magnetization and demagnetization of said relays.

9. An electric railway system comprising normally closed rail circuits embodying sections of track, relay magnets and a source of current supply connected to said sections, a sectional working or contact conductor, a high voltage alternating current generator, leaders therefrom, transformers having their primaries connected to said leaders, the secondaries of said transformers being arranged for connection to said track sections and to said working or contact sections respectively, but normally disconnected electrically from the latter, magnetically controlled switches arranged to connect said secondaries to said contact sections and to disconnect the same therefrom, and magnetically controlled signals, the magnets controlling said signals and said last named switches being in the same circuit, said circuit being opened and closed by a switch under control of said relays.

10. In an electric railway system embodying a continuously closed main or track circuit and a sectional working or contact conductor, a source of working current supply, normally disconnected from said working sections, stationary means actuated by a passing car or train for connecting said current supply to the working sections occupied by said car or train, and electrically controlled means actuated by a car or train on one section for opening circuit in the feed connection furnishing current to another section, whereby a train entering upon the latter section will be deprived of working current and become dead.

11. In an electric railway system comprising a continuously closed main circuit, and having sectional contact or working conductors, a source of working current supply normally disconnected from said working sections, means for automatically connecting said current supply to said sections and to the return for said current, a car or train, and means under control thereof for automatically preventing the delivery of working current to a working section to the rear of the section occupied by said car or train.

12. In an electric railway system comprising a sectional working or contact conductor, a source of working current supply normally disconnected from said sections, a plurality of independent automatic switches for connecting said current supply operatively to said respective working sections, one of said switches being normally open and under control of a train or car on the section with which it is connected, and another switch normally closed and arranged for control by a train or car on a different section.

13. In an electric railway system comprising a sectional working or contact conductor, a high voltage alternating current generator, leaders therefrom, transformers having their primaries connected thereto, the secondaries of said transformers, respectively, having one terminal arranged for connection to the working sections, but normally disconnected therefrom, and the opposite terminal normally operatively connected to the return for the working current, means for connecting said secondaries operatively to said working sections upon the passage of a car or train thereon, and independent means for automatically disconnecting said secondaries operatively from said sections upon the passage of a car or train upon a different section from that to which said secondaries are directly connected.

14. In an electric railway system comprising a sectional working or contact conductor, a high voltage alternating current generator, leaders therefrom, transformers having their primaries connected thereto, the secondaries of said transformers, respectively, having one terminal arranged for connection to the working sections, but normally disconnected therefrom, and the opposite terminal normally connected operatively to the return for the working current, a plurality of independent, electrically controlled switches in the respective circuits of said secondaries, each secondary having one switch normally open and another normally closed, means for automatically closing a switch in each secondary for connecting said secondary operatively to a section of said working conductor upon the passage of a car or train upon said section, and means for automatically opening the circuit of said secondary, through an independent switch, upon the entrance of a car or train upon a different section.

15. In an electric railway system, a working or contact conductor formed in sections separated or insulated from one another, a traction rail formed in corresponding sections separated or insulated from one another, a working current feeder normally disconnected from said working sections, but having one terminal arranged for connection thereto, the opposite terminals being normally connected to the respective sections of said traction rail, a car or train, means actuated by an independent current under control of said car or train for connecting said working current feeder to said respective working sections when said car or train enters thereupon, the respective sections of the traction rail comprising returns for the working current feeders connected thereto.

16. An electric railway system comprising normally closed sectional traction rail circuits, current feeders connected to the opposite rails of said circuits, relay magnets having their opposite terminals connected to said opposite rails, a working or contact conductor formed in sections separated or insulated from one another, a propulsion current feeder normally disconnected from said working sections, a car or train, means under control thereof for automatically connecting said current feeder to said working sections and disconnecting the same therefrom, means under control of said car or train on one block for opening circuit in the propulsion current feeder arranged to furnish working current to a section or block in the rear of that occupied by said train, a second or following car or train, and means under control thereof on entering upon the last named section or block, for opening circuit between the propulsion current feeder and the working section in the block following the block thus entered upon by said train, the whole arranged so that each train of a series following one another will operate to keep an electrically dead section or block between itself and a following train.

WILLIAM ROBINSON.

Witnesses:
GEORGE H. HALE,
L. H. HOBBS.